United States Patent [19]
Kito et al.

[11] Patent Number: 4,720,301
[45] Date of Patent: Jan. 19, 1988

[54] REVERSIBLE HEAT SENSITIVE RECORDING COMPOSITION

[75] Inventors: Tsutomu Kito, Gifu; Norikazu Nakasuji, Aichi; Takashi Kataoka, Aichi; Hiroshi Inagaki, Aichi; Yutaka Shibahashi, Aichi, all of Japan

[73] Assignee: Pilot Ink Co., Ltd., Japan

[21] Appl. No.: 807,908

[22] Filed: Dec. 11, 1985

[51] Int. Cl.⁴ .............................................. C09D 11/00
[52] U.S. Cl. ...................................... 106/21; 503/213; 503/216; 503/217; 503/219; 503/220; 503/221; 503/222; 503/223; 503/224; 503/225
[58] Field of Search .................. 106/21; 346/216, 217, 346/219, 220, 221, 222, 223, 224, 225, 213; 427/150, 151; 428/320.4, 320.6

[56] References Cited

U.S. PATENT DOCUMENTS 4,028,118 6/1977 Nakasuji et al. ...................... 106/21
4,399,188 8/1983 Yamato et al. ...................... 428/211

*Primary Examiner*—Amelia Burgess Yarbrough
*Attorney, Agent, or Firm*—Sughrue, Mion, Zinn, Macpeak, and Seas

[57] ABSTRACT

A new reversible heat sensitive recording composition for erasable recording is disclosed which is used as a recording or marking material that is capable of erasure at a specific temperature so that coloring or decoloring can be controlled to occur at desired temperature ranges. This range or the hysteresis value of the composition is determined by the ΔT value of the contained ester compound. In addition, the composition can provide a wide variety of hues and can readily be prepared. The marking or recording drawn in this composition can be maintained at room temperature or less.

2 Claims, 2 Drawing Figures

REVERSIBLE HEAT SENSITIVE RECORDING COMPOSITION

BACKGROUND OF THE INVENTION

1. Field of the Invention

The present invention relates in general to a reversible heat sensitive recording material, and in more particular to such a composition composed of an ester compound having a specific ΔT value (ΔT in centrigrade degree=melting point−clounding point) and capable of developing upon the application of partial heat of low or high temperature. The image thus developed in normal or reversed form can be maintained for recording in a condition of specific temperature ranges, and can be erased by exposure to a low or high temperature. Thus, this invention can be applied to cases where the marking or recording requires repeated erasure.

2. Description of the Prior Art

Conventional reversible heat sensitive recording materials in general utilize the thermal sensitive coupling properties of metallic complex salts such as $Ag_2HgI_4$ and $Cu_2HgI_4$. However, these materials have the following disadvantages:

(1) Impracticable in optionally selecting an image maintaining temperature

The metallic complex salts are limited in the kind of available compound and require 40° C. or higher to maintain their recording phase. Consequently, these materials are not acceptable where the recording must be kept at room temperature or lower.

(2) Narrower recording temperature range for maintaining the recording

Since the temperature range in which the contained metallic complex salt maintains its recording phase is extremely narrow, strict temperature control is required to keep the marking or recording visible.

(3) Improper contrast of the recording against the background

Since the obtainable color strength is not sufficient, the image or recording is not clearly visible against the background.

(4) Unavailable freely selecting a hue (5) Various limitations on preparating and processing dye Because of these problems, most conventional reversible heat sensitive recording materials are widely unacceptable in the practical fields of applications.

SUMMARY OF THE INVENTION

The present invention has been proposed to eliminate the above-mentioned problems Therefore, a primary objective of the present invention is to provide a reversible heat sensitive recording composition for recording or marking that is erasable at a specific temperature so that coloring or decoloring can be controlled to occur at desired temperature ranges.

Another objective of this invention is to provide such a composition capable of maintaining the developed recording at a low and wide range of temperature.

Another objective of this invention is to provide such a composition which provides a wide range of hues.

Still another objective is to provide such a composition with minimum limitation on industrial preparation.

According to the present invention there is to provide a reversible heat-sensitive recording composition comprising:

(A) an electron-donating chromatic organic compound selected from the group consisting of diaryl phthalides, indolyl phthalides, polyaryl carbinols, leuco auramines, acyl auramines, aryl auramines, Rhodamine B lactams, indolines, spiropyrans, and fluorans;

(B) a compound selected from the group consisting of phenolic compounds having 6 to 49 carbon atoms, metal salts of the phenolic compounds, aromatic carboxylic acids having 7 to 12 carbon atoms, aliphatic carboxylic acids having 2 to 5 carbon atoms, metal salts of carboxylic acids having 2 to 22 carbon atoms, acidic phosphoric esters having 1 to 44 carbon atoms, metal salts of the acidic phosphoric esters and triazole compounds having 2 to 24 carbon atoms; and (C) an ester compound, said components (A), (B) and (C) being present in a weight ratio in the range of 1:0.1 to 50:1 to 800 and being in the form of homogenous fused mixture, wherein said component (C) is selected from the following compounds having ΔT value [melting point (°C.)−clouding point (°C.)] in the range of from 5° C. to less than 50° C.: an alkyl ester, aryl ester and cycloalkyl ester of aromatic carboxylic acid having substituent(s) or not in the aromatic ring, a branched alkyl ester, aryl ester, arylalkyl ester and cycloalkyl ester of aliphatic carboxylic acid, an alkyl ester of alicylic carboxylic acid, a diester of dicarboxylic acid and a glyceride.

DETAILED DESCRIPTION OF THE PREFERRED EMBODIMENTS

Figure 1:
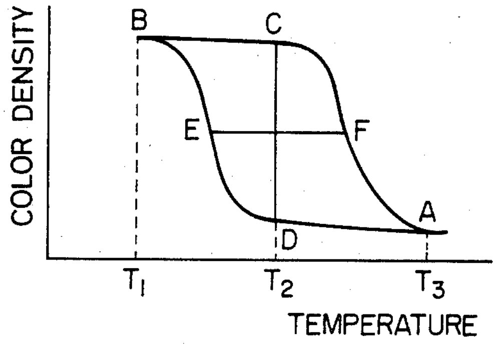
FIG. 1 illustrates graphically a relationship between color density and temperature indicating the hysteresis characteristic of the reversible heat sensitive recording composition prepared in accordance with the present invention.

The above and other advantages of the reversible heat sensitive recording material are provided by the combination into a homogenous compatible state of, as main ingredients, (A) an electron-donating chromatic organic compound, (B) a compound selected from the group of phenolic compounds, metal salts of phenolic compounds, aromatic carboxylic acids, aliphatic carboxylic acids having 2 to 5 carbon atoms, metal salts of carboxylic acids, acidic phosphoric esters, metal salts of acidic phosphoric esters, 1,2,3-triazole compounds, and (C) one or more of the ester compounds having ΔT value (melting point−clouding point=ΔT) in the range from not lower than 5° C. to not higher than 50° C.

In the composition, ingredients (A), (B), and (C) may control functions for the type of hue, color density and coloring or decoloring temperature, respectively. In combination of these ingredients, there is to provide a various reversible heat sensitive recording composition which can be mixed into a desired ratio in combination that be determined the type of hue, color strength, coupling or decoloring temperature, and record maintaining temperature range etc, on demand.

The characteristics of the reversible heat sensitive recording composition according to the present invention resides in the ingredient (C).

As the ingredient (C), any ester compound may be allowed, provided that its $\Delta T$ value (defined as $\Delta T$=melting point−clouding point) falls in the range from 5° C. or over to under 50° C. The inventors attribute the present invention to the hitherto entirely novel discovery, as a result of extensive analytical research into the thermally coloring characteristic of reversible heat sensitive recording compositions, that the deviation of the point of decoloring from the coupling point of temperature or the hysteresis margin ($\Delta H$) has a close correlation with the $\Delta T$ value of the ingredients contained in the composition selected from the ester group. Utilizing this correlation, the present invention can provides a wide range of coupling and image maintaining temperatures from −80° C. to −100° C. in the embodied reversible heat sensitive recording material. A marked and entirely new advantage obtainable from this invention is that the marking or recording can occur and maintain at lower than 40° C., or even at or lower than room temperature. Consequently, no energy or temperature control, unlike the conventional reversible heat sensitive recording materials, are required at all to keep the markings or recordings since they are sufficiently visible at room temperature. Thus, the present invention can contribute to energy saving and convenience in wide fields of industrial application. The reversible heat sensitive recording composition of the present invention has advantage for overcoming above mentioned drawbacks, and specific ester having a specific $\Delta T$ value has advantage for predicting a hysteresis property to effectively prepare the composition according to the predetermined $\Delta T$ value.

Another advantage of the present invention, aside from the elimination of those conventional disadvantages, is that, from the aforesaid correlation of $\Delta T$ value in the contained ester compound with the hysteresis range ($\Delta H$) of the composition, the histeresis range of a particular planned composition can be predicted by computations and controlled in process stages. This adds to optimizing the preparation of reversible heat sensitive recording materials.

The reversible heat sensitive recording material of the present invention will be described in detail with referring to the accompanying drawings showing curves plotted to indicate the correlation of $\Delta T$ and $\Delta H$.

FIG. 1 is curves plotted to indicate the hysteresis according to which the reversible heat sensitive recording composition causes the repeatable phenomenon of coloring and decoloring the material.

In FIG. 1, the sign A indicates the point of color density at which complete decoloring occurs at the lowest temperature $T_3$. The sign B represents the point at which full developing takes place at the highest temperature $T_1$. At the in-between level of temperature $T_2$, there exist two different states of color density, indicated at C and D, the sign C is the level of color density reached on the increase of temperature while the sign D being the level on the decrease of temperature. The difference between C and D determines the contrast of the marking or recording against the background or visibility that differs in distinctness between temperature increasing and decreasing conditions to which the composition of this invention is exposed. The line EF intersecting at right angles the line CD between the curves represents the range of hysteresis ($\Delta H$) of the composition. It can be said that the wider the span EF, the easier the recording can be maintained. It has been discovered, from the inventors' experiments, that this range of hysteresis in terms of temperature interval must be not lower than 5° C., and more preferably 8° C., to provide practically desired recording maintenance.

Figure 2:
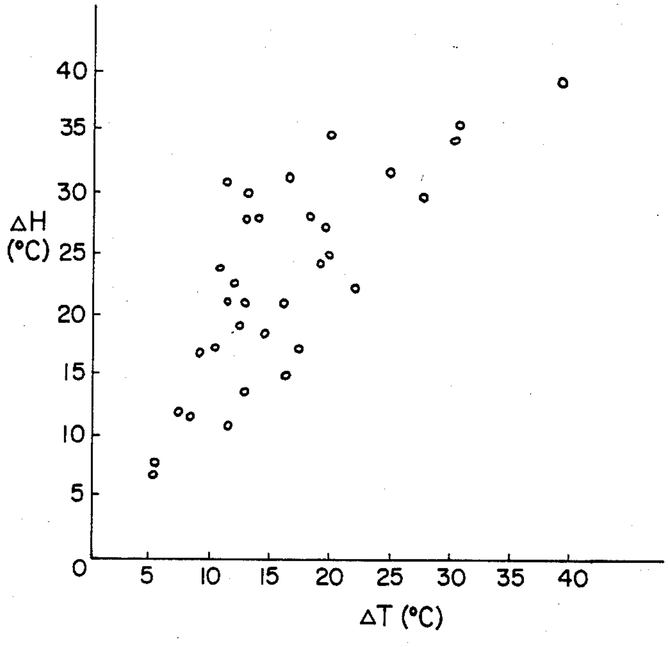
FIG. 2 is a scatter diagram plotted to illustrate the correlation of the ΔT value of the ester compound with the histeresis value (ΔH) of the composition.

FIG. 2 is a scatter diagram plotted to indicate the relationship between the $\Delta T$ value of the contained ester ingredient (C) and the $\Delta H$ value of reversible heat sensitive recording composition. It is obvious from study of the diagram that there is a very close relationship between $\Delta T$ and $\Delta H$. Further, this relationship tells definitely that, when the $\Delta T$ value is 5° C. over, the desired $\Delta H$ value of more than 5° C. is obtainable. Generally, an erasable recording material can satisfy the requirements of practical application if the $\Delta H$ value in terms of temperature interval is over 50° C.

Thus, it is possible from the same diagram to effectively estimate the $\Delta H$ range of a given reversible heat sensitive recording material by computing the $\Delta T$ value of the contained ester compounds. Conversely, it is possible to control the $\Delta H$ range in the preparation of such compositions, eliminating the conventional inconvenient situation that the $\Delta H$ range can be determined only after the composition is prepared.

In addition, as the ingredient (C) having $\Delta T$ value in the range from over 5° C. to under 50° C., those allowable ester compounds can be easily manufactured from extremely extensive varieties of acids and alochols. Further, they vary relatively widely from one another in $\Delta H$ range, so that the present invention can find a very wide field of applications.

The ratio of each ingredient in the composition varies depending on the desired color density, the coloring or decoloring temperature, the mode of color change, or the kinds of the contained compounds. However, our study has discovered that the composition can most likely provide a desired characteristic from the combination, against 1 part of ingredient (A), of 0.1 to 5.0, and more preferably 0.5 to 20, parts of ingredient (B) and 1 to 800, and more preferably 5 to 200, parts of ingredient (C), all by weight ratio. Two or more compounds can be mixed from each of the ingredients (A), (B), and (C). In addition, the composition may contain proper amounts of anti-oxidants, ultraviolet light absorbents, solubilizers, thinners, and/or intensifiers.

In addition, the composition according to the present invention permits the addition as auxiliary agents alcohols, amids, ketones and/or sulfides, if required, so long as they do not affect the hysteresis characteristic of the contained ester compounds (C). It is important to note, however, that these additives tend to change the hysteresis range if contained more than 50% by weight. Thus, it is preferable to limit their inclusion below this limit.

The ingredients (A), (B), and (C) will be described in great detail.

The electron-donating chromatic organic compound (A) may be selected from the group consisting of diaryl phtalides, polyaryl carbinols, leuco auramines, acyl auramines, aryl auramines, Rhodamine B lactams, indolines, spiropyrans, and fluorans.

The examples of this group are as follows:

Crystal violet lactone, malachite green lactone, Milcher's hydrol, crystal violet carbinol, malachite green carbonil, N-(2,3-dichlorophenyl) leuco auramine, N-benzoyl auramine, Rhodamine B lactams, N-acetyl auramine, N-phenyl auramine, 2-(phenyl iminoethane dilidene)-3,3-dimethyl indoline, N-3,3-trimethly indolinobenzospiropyran, 8-methoxy-N-3,3-trimethyl indolinobenzospiropyran, 3-diethylamino-6-methyl-7-chlorofluoran, 3-diethylamino-7-methoxyfluoran, 3-diethylamino-6-benzyloxyfluoran, 1,2-benz-6-diethylaminofluoran, 3,6-di-p-toluidino-4,5-dimethyl-fluoran-phenylhydrazide-γ-lactam, 3-amino-5-methylfluoran, 2-methyl-3-amino-6-methyl-7-methylfluoran, 2,3-butylene-6-di-n-butylamino fluoran, 3-diethylamino-7-anilino fluoran, 3-diethylamino-7-(p-toluidino)-fluoran, 7-acetoamino-3-diethylamino fluoran, 2-bromo-6-cyclohexylamino fluoran, 2,7-dichloro-3-methyl-6-n-butylamino fluoran, etc.

The allowable compounds as the component (B) may be selected from the following groups (a) through (g).

(a) The group consisting of phenolic hydroxides, both monophenols and polyphenols, including the substituted thereof with alkyl, aryl, acyl, and alkoxycarbonyl groups and halogens.

The examples of these compounds are as follows:

Tert-butylphenol, nonylphenol, dodecyl phenol, styrenated phenols, 2,2-methylene-bis-(4-methyl-6-tert-butylphenol), α-naphthol, β-naphthol, hydroquinemonomethyl-ether, guaiacol, eugenol, p-chlorophenol, p-bromophenol, o-chlorophenol, o-bromophenol, o-phenyl phenol, p-phenyl phenol, p-(p-chlorophenyl)-phenol, o-(o-chlorophenyl)-phenol, p-methyl hydroxy benzoate, p-ethyl hydroxy benzoate, p-octyl hydroxy benzoate, p-butyl hydroxy benzoate, p-octyl hydroxy benzoate, p-dodecyl hydroxy benzoate, 3-iso-propyl catechol, p-tert-butyl catechol, 4,4-methylene diphenol, 4,4-chio-bis-(6-tert-butyl-3-methyphenol), 1,1-bis-(4-hydroxyphenol)-cyclohexane, 4,4-butylidene-bis-(6-tert-butyl-3-methylphenol, bisphenol A, bisphenol S, 1,2-dioxynaphtaleine, 2,3-dioxynaphthalein, chlorocatechol, bromo catechol, 2,4-dihydroxybenzophenon, pheno phtalein, o-cresol phthalein, methyl protocatechinate, ethyl protocatechinate, propyl protocatechinate, octyl protocatechinate, dodecyl protocatechinate, 2,4,6-trioxymethyl benzene, 2,3,4-trioxyethyl benzene, methyl gallicate, ethyl gallicate, propyl gallicate, butyl gallicate, hexyl gallicate, octyl gallicate, dodecyl gallicate, cetyl gallicate, stearyl gallicate, 2,3,5-trioxynaphthalein, tannin acid and phenol resins.

(b) The group of metal salts of the above phenolic hydroxides, the metal being any selected from the group of sodium, potassium, lithium, calcium, zinc, zirconium, aluminum, magnesium, nickel, cobalt, tin, copper, iron, vanadium, titanium, lead, and molydenum.

(c) The aromatic carboxylic acids and aliphatic carboxylic acids having 2 to 5 carbon atoms that include maleic acid, fumaric acid, benzoic acid, toluic acid, p-tert-butyl benzoate, chlorobenzoate, bromobenzoate, ethoxy benzoate, gallic acid, naphthoic acid, phthalic acid, naphthalein-dicarboxylic acid acetic acid, propionic acid, butyric acid and valeric acid.

(d) The group of metal salts of carboxylic acids, both mono carboxylic and polycarboxylic acids. Following are the examples of this group.

Acetic acid, propionic acid, butyric acid, caproic acid, caprylic acid, capric acid, lauric acid, myristic acid, palmitic acid, stearinic acid, isostearinic acid, behenic acid, crotonic acid, olenic acid, elaidinic acid, linoleic acid, linolenic acid, monochloroacetate, monobromoacetate, monofluoroacetate, glycollic acid, hydroxyl propionate, hydroxy butyrate, ricinolic acid, 12-hydroxy stearate, lactic acid, pyruvic acid, oxalic acid, malonic acid, succinic acid, adipic acid, sebacic acid, malic acid, tartaric acid, valeric acid, maleic acid, fumaric acid, naphthenic acid, benzoic acid, toluic acid, phenyl acetate, p-tert-butyl benzoate, cinnamic acid, chlorobenzoate, bromobenzoate, ethoxy benzoate, mandelic acid, protocatechinate, vanillinic acid, resorcinic acid, dihydroxy benzoate, dihydroxychlorobenzoate, gallic acid, naphthoic acid, hydroxy naphthoate, phthalic acid, monoethylester phthalate, naphthalein-dicarboxylic acid monoethylester naphthalein dicarboxylate, trimellitic acid, and pyrromellitic acid (as metal salts the metal being any selected from the group of sodium, potassium, lithium, calcium, zinc, zirconium, aluminum, magnesium, nickel, cobalt, tin, copper, iron, vanadium, titanium, lead, and molybdenum.

(e) The group of alkyl esters, branched alkyl esters, alkenyl esters, alkynyl esters, cycloalkyl esters, and allyl esters of acidic phosphoric compounds, both monoesters and diesters, and their combinations (denoted as acidic phosphate below). The examples of this group are as follows.

Methyl acid phosphate, ethyl acid phosphatre, n-propyl acid phosphate, n-butyl acid phosphate, 2-ethylhexyl acid phosphate, n-octyl acid phosphate, isodecyl acid phosphate, n-decyl acid phosphate, lauryl acid phosphate, myristyl acid phosphate, cetyl acid phosphate, stearyl acid phosphate, dococyl acid phosphate, oleoyl acid phosphate, 2-chloroethyl acid phosphate, 2,3-dibromo-2,3-dichloropropyl acid phosphate, dichloropropyl acid phosphate, cyclohexyl acid phosphate, phenyl acid phosphate, o-tolyl acid phosphate, 2,3-xylyl acid phosphate, p-cumenyl acid phosphate, mesityl acid phosphate, 1-naphtyl acid phosphate, 2-naphtyl acid phosphate, 1-anthryl acid phosphate, benzyl acid phosphate, phenethyl acid phosphate, stearyl acid phosphate, cinnamyl acid phosphate, trityl acid phosphate, phenylmethyl phosphate, phenylethyl phosphate, phenyl n-propyl phosphate, phenyl n-butyl phosphate, phenyl n-octyl phosphate, phenyllauryl phosphate, phenylcyclohexyl phosphate, phenyl-(2,3-xylyl) phosphate, cyclohexylstearyl phosphate, cyclohexylcetyl phosphate, dimethyl phosphate, diethyl phosphate, di-n-propyl phosphate, di-n-butyl phosphate, di-n-hexyl phosphate, di-(2-ethylhexyl) phsophate, di-n-decyl phosphate, dilauryl phosphate, dimyristyl phosphate, dicetyl phosphate, distearyl phosphate, dibehenyl phosphate, diphenyl phosphate, diclohexyl phosphate, di-o-tryl phosphate, bis-(diphenylmethyl) phosphate, bis-(triphenylmethyl) phosphate, di(2,3-xylyl) phosphate, dibenzyl phosphate, and di(1-naphthyl) phosphate.

(f) The group of metal salts of the above group (e), the metal being any selected from the category of sodium, potassium, lithium, calcium, zinc, zirconium, aluminum, magnesium, nickel, cobalt, tin, copper, iron, vanadium, titanium, lead, and molybdenum.

(g) The tiazole compounds include 1,2,3-triazole, 4(5)-hydroxyl-1,2,3-triazole, 5(6)-methyl-1,2,3-benzotriazole, 5-chloro-1,2,3-benzotriazole, 7-nitro-1,2,3-benzotriazole, 4-benzoylamino-1,2,3-benzotriazole, 4-hydroxy-1,2,3-benzotriazole, naphthol-1,2,3-triazole, 5,5'-bis(1,2,3-benzotriazole), and 1,2,3-benzotriazole-4-sulfooctyamide.

The available compound as ingredient (C) may be selected from the following:

The group consisting of ester compound having ΔT value in the range from over 5° C. to under 50° C. that include an alkyl ester, aryl ester, and cycloalkyl ester of aromatic carboxylic acid having substituent(s) or not in the aromatic ring, a branched alkyl ester, aryl ester, arylalkyl ester, and cycloalkyl ester of aliphatic carboxylic acid, an alkyl ester of alicyclic carboxylic acid and a glycerid. Following are the ester compounds which may be employed.

Stearyl 2-methylbenzoate, cetyl 4-tert-butylbenzoate, behenyl 4-cyclohexylbenzoate, myristyl 4-phenylbenzoate, lauryl 4-octylbenzoate, hexyl 3,5-dimethylbenzoate, stearyl 3-ethylbenzoate, butyl 4-benzylbenzoate, octyl 3-methyl-5-chlorobenzoate, decyl 4-isopropylbenzoate, stearyl 4-benzoylbenzoate, stearyl 1-naphthoate, cetyl phenylacetate, stearyl phenylacetate, phenyl 4-tert-butylbenzoate, 4-chlorobenzyl 2-methyl benzoate, stearyl 4-chlorobenzoate, myristyl 3-bromobenzoate, stearyl 2-chloro-4-bromobenzoate, decyl 3,4-dichlorobenzoate, octyl 2,4-dibromobenzoate, cetyl 3-nitrobenzoate, cyclohexyl 4-aminobenzoate, cyclohexylmethyl 4-amino benzoate, cetyl 4-diethyklaminobenzoate, stearyl 4-aminobenzoate, decyl 4-methoxybenzoate, cetyl 4-methoxybenzoate, stearyl 4-methoxybenzoate, octyl 4-butoxybenzoate, cetyl 4-butoxybenzoate, 4-methoxybenzyl benzoate, cetyl p-chlorophenylacetate, stearyl p-chlorophenylacetate, decyl 3-benzoylpropionate, cyclohexyl 2-benzoylpropionate, myristyl benzoate, cetyl benzoate, stearyl benzoate, 4-chlorobenzyl benzoate, benzyl cinnamate, cyclohexylmethyl cinnamate, benzyl caproate, 4-chlorobenzyl caprate, 4-methoxybenzyl myristate, 4-methoxy benzyl stearate, benzyl palmitate, 4-nitrobenzyl stearate, neopentyl caprylate, neopentyl laurate, neopentyl stearate, neopentyl behenate, cyclohexyl laurate, cyclohexyl myristate, cyclohexyl palmitate, cyclohexylmethyl stearate, 2-cyclohexyl ethyl stearate, stearyl cyclohexylpropionate, 3-phenylpropyl stearate, 4-methoxybenzyl caproate, 4-methoxybenzyl caprate, 2-chlorobenzyl myristate, 4-isopropylbenzyl stearate, phenyl 11-bromolaurate, 4-chlorophenyl 11-bromolaurate, didecyl adipate, dilauryl adipate, dimyristyl adipate, dicetyl adipate, distearyl adipate, dibenzyl sebacate, distearyl tere-phthalate, dineopentyl 4,4'-diphenyldicarboxylate, dibenzyl azodicaroboxylate, trilaurin, trimyristin, tristearin, dimyristin and distearin.

In practical application, the reversible heat sensitive recording composition according to the present invention may be used in a pulverized or heat molten state. However, it may more efficiently be handled in a microcapsule. Capsulation can be done in any known method such as coacervation, interfacial polymerization, in situ polymerization, or spray drying.

The reversible heat sensitive recording composition according to this invention in the form of microcapsules can be applied in quite the same manner as in conventional practice in plastics, rubber materials or other surfaces or as printing ink, paint, pen ink or spraying material.

The composition of this invention will be described in concrete examples. It is to be understood, however, that the present invention should not be limited to the examples given.

In the examples, determination of melting and clouding points, on both of which the ΔT value was calculated, was performed using a melting point apparatus as a type of automatically measuring variation of transmittance of a sample with temperature. The melting point was taken as the level of temperature at which the sample reached completely molten state. Every value in the obtained test data is the mean of 3 measured samples.

Further, determination of the ΔH was based on the difference of color density (represented by EF in FIG. 1) at different temperatures, using a color difference meter. Further, the electron-donating chromatic organic compounds to be mixed are referred in abbreviation in the examples as CFs, followed by a number (e.g., CF-1, CF-2, and so on). Their respective chemical constitutions are together identified later in the specification.

EXAMPLE 1

A mixture of 2 g of CF-1, 6 g of thiodiphenol, 50 g of stearyl benzoate was heated until it melted into a homogenous state, and then capsulated by known coacervation process into microcapsules. 50 g of the thus formed microcapsules, now containing the reversible heat sensitive recording composition of this invention, was put into a prepared solution in 80 g water of 200 g of copolymerized ethylene-vinyl acetate emulsion (negatively charged, 4.5 to 5.5 in pH, 2,000 cps in viscosity at 30° C., and 50% in solid content) and 10 g of sodium alginate, and stirred into a homogenously distributed state in the solution. The 100 micron thick film of polyester was coated fully over its surface with this mixture and then laminated with a 30 micron film of polypropyrene to give a recording film. The recording film, while kept at 30° C. in a heating panel, was recorded in with a reversed image with a thermosensitive recorder. The image was obtained in a sharply constrasted reversal against the background, colored in magenta, and hold without decoloration for any long periods of time so long as the temperature of 30° C. was sustained.

Then, the film was exposed to different temperatures and proved to hold the image within the range of 20° C. to 39° C. Next, the film was heated at 55° C. in a heating oven until it bleached, all the image completely erased, and, after having been cooled at 0° C., while being heated at 30° C. on the heating panel, recorded with, now, a normal image, using a heat sensitive recorder. The produced image was found to be invariably sharply contrasted against the background. Many cycles of recording and erasing were repeated and the image, whether reversed or normal, was each time was clear.

The stearyl benzoate measured to give 13.1 of ΔT.

The reversible heat sensitive recording composition prepared gave 28.0 of ΔH.

EXAMPLE 2

A mixture composed of 5 g of CF-2, 10 g of bisphenol A, and 100 g of trilaurin was heated until it melted into a homogenous state, and then capsulated by known coacervation method into microcapsules containing the reversible heat sensitive recording material of this invention. Then, 80 g of the microcapsules thus produced was mixed into a prepared mixture composed of 200 g of polymerized ester acrylate emulsion (negatively charged, 4 in pH, under 150 cps in viscosity, 31% in solid content), 4 g of sodium alginate, and 0.5 g of bridging agent into a homogenously distributed state. With the resultant product, the T-shirt was printed in its front breast part with a 20 cm diameter circle which was then treated by a suitable cross-linking process to form a temperature responsive area.

The T-shirt thus printed was cooled at low refrigerator temperature until the circle pattern developed in green. The image drawn in the area of the T-shirt placed under room temperature (20° C.) using a thermopen maintaining a temperature of 60° C. was found sharply contrasted against the background, colored in green, and remain without the slightest decoloration for about 24 hours under the same room temperature. In addition, the image was proved to hold in the temperature range 15° C. to 30° C.

Next, the coated area was heated by a hair drier until it got completely breached, with the drawn image erased, and drawn in at room temperature (20° C.) with a thermopen of 5° C. The produced image was found clear in green and held without decoloring at all for long periods of time. The reversible heat sensitive recording material of this example was also proved, from further experiments, to be capable of repeated coloring and decoloring cycles.

The trilaurin was estimated 20° C. in ΔT value.

The reversible heat sensitive recording material of this example gave 35° C. of ΔH.

EXAMPLE 3

A mixture composed of 6 g of CF-3, 15 g of bis(4-hydroxyphenyl) methane, and 100 g of neopentyl stearate was heated until it melted into a homogenous state, and then capsulated by known interfacial polymerization process into microcapsules containing the reversible heat sensitive recording material according ot this invention. 80 g of the microcapsules thus prepared was mixed in a prepared solution in 200 g of water composed of 20 g of copolymerized styrene-maleinic acid anhydride and 5 g of 28% ammonia water into a homogenously mixed state to give an aqueous photogravure ink.

The mirror-coated paper was printed by photogravure process using the ink thus prepared. The printed paper was coated with adhesive on the backside and cut to stickers 1 cm by 4 cm in size, which were sticked up in 100 pieces of plastic card about the size of name cards. First, the 100 cards were all cooled at 10° C. in a refrigerator until they turned all black in color, and then identified in reversed image with a sequential number from 1 to 100, using a thermopen. All of the recorded numbers were found to hold without decoloring for long periods of time so long as the temperature was kept in a range 14° C. to 29° C. Thereafter, all the cards were heated at 40° C. in a heating oven until they breached, all the numbers drawn on them erased, and again identified with a sequential number from 101 to 200, using the thermopen under room temperature. The cards were then exposed to a temperature of 40° C. again, which caused all of the cards to get bleached. Thus, repeated cycles of coloring and decoloring processes were possible.

The neopentyl stearate was measured to give 12.2° C. of ΔT value.

The reversible heat sensitive recording material of this example was 19.5° C. in ΔH.

Following the preparation method of Example 1, the different versions of reversible heat sensitive recording composition were prepared and tested. The results, together with the values of ΔT and ΔH in terms of the reversible heat sensitively colored composition of Examples 4 to 6, are presented in the Table.

TABLE

| Example No. | Reversible heat sensitive recording composition: Component (A) | Component (B) | Component (C) | ΔT of component (C) | ΔH of composition | Temperature (°C.) and color: T1 | T2 | T3 |
|---|---|---|---|---|---|---|---|---|
| 4 | CF - 4 (6 g) | 1,2-bis(4-hydroxyl phenyl)-cyclohexane (15 g) | Neopentyl behenate (100 g) | 12.8 | 13.5 | 20 (Vermilion) | 40 | 65 (White) |
| 5 | CF - 5 (8 g) | 2,3-xylyacid phosphate (15 g) | 4-tert-cetylbutyl benzoate (100 g) | 12.7 | 30.0 | −10 (Dark red) | 15 | 40 (Green) |
| 6 | CF - 6 (6 g) | Zinc salt of bisphenol A (10 g) | Dilauryl adipate (100 g) | 9.8 | 17.2 | 10 (Pink) | 25 | 60 (White) |

For Signs T1, T2, and T3, see FIG. 1.

The electron-donating chromatic organic compounds represented in code in the examples are as follows:

CF-1: 3-diethylamino-7,8-benzofluoran

CF-2: 6'-(diethylamino)-2'-[cyclohexyl(phenylmethyl-)amino]-spiro[isobenzofuran-1(3H),9'-(9H)-xanthen]-3-one CF-3: 2'-[(4-n-butylphenyl)amino]-3'-methyl-6'-(dietylamino)-spiro[isobenzofuran-1(3H),9'-(9H)-xanthen]-3-one CF-4: 3-diethylamino-6-methyl-7-chlorofluoran CF-5: 3-diethylamino-5-methyl-7-dibenzylfluoran CF-6: 3,3-bis(1-ethyl-2-methyl-1H-indol-3-yl)-1(3H)-isobenzofuranone The reversible heat sensitive recording composition in accordance with the present invention can have a wider range of colors and image maintenance temperatures providing for a greater field of application, compared with those conventional compositions utilizing the coloring characteristics of metal salts. In particular, since the marking by this composition can hold at room temperature, no extra temperature control means is necessary, contributing energy saving. Also, the present invention provides a sharper contrast of image against the background. Now, if this contrast is expressed in terms of brightness in which pure white is graded as 10 while black at 0, that obtainable with those conventional materials using $Ag_2HgI_4$ is in a range approximately 1.0 to 1.1 (color change from yellow to orange) while the contrast (largely represented by the difference CD in FIG. 1) with the composition of this invention is in a range 6.5 to 7.0 (black image against white background), or approximately 5.0 (blue image against white background), or approximately 4.0 (red image against white background). In addition, the present invention enables estimation of the ΔH value of the composition, the hysteresis range that determines the range of temperature in which the composition holds contrast, based on the ΔT value (defined as melting point−clouding point=ΔT) of the contained ester compounds, so that control of this ΔH value is possible in the preparation for a variety of applications and purposes. This is one of the most important advantages of this invention since, with conventional compositions, the ΔH value is determined from the finished state of the product.

The present invention can find use in wide fields of application. Besides the recording or marking materials, capable of repeated erasure, it can be used as a thermosensitive display material or a writing board in which the user may write with a thermopen and erase with a low temperature eraser.

Since the composition of this invention permits repeated recording and erasing, it can be used to record reception numbers at banks, hospitals, and supermarkets, locating numbers in archives, libraries, and parking pools, balances of deposit on the magnetic cards of banks, gas stations, and other on-credit vendors, counts or readings in dispensing machines and warning levels in freezers and food packages to prevent overfreezing. Further, the composition can be used to draw patterns for security on anti-burglar stickers or for fancy on ties, T-shirts, training wears, blouses, gloves, skiing wears, ribbons, tapestries, and curtains since repeated changes of design are possible.

While the invention has been described in detail and with reference to specific embodiment thereof, it will be apparent to one skilled in the art that various changes and modifications can be made therein without departing from the spirit and scope thereof.

What is claimed is:

1. A reversible heat-sensitive recording composition comprising:

(A) an electron-donating chromatic organic compound selected from the group consisting of diaryl phthalides, indolyl phthalides, polyaryl carbinols, leuco auramines, acyl auramines, aryl auramines, Rhodamine B lactams, indolines, spiropyrans, and fluorans;

(B) a compound selected from the group consisting of phenolic compounds having 6 to 49 carbon atoms, metal salts of the phenolic compounds, aromatic carboxylic acids having 7 to 12 carbon atoms, aliphatic carboxylic acids having 2 to 5 carbon atoms, metal salts of carboxylic acids having 2 to 22 carbon atoms, acidic phosphoric esters having 1 to 44 carbon atoms, metal salts of the acidic phosphoric esters and triazole compounds having 2 to 24 carbon atoms; and (C) an ester compound, said components (A), (B), and (C) being present in a weight ratio in the range of 1:0.1 to 50:1 to 800 and being in the form of homogenous fused mixture, wherein said component (C) is selected from the following compounds having ΔT value [melting point (°C.)−clouding point (°C.)] in the range of from 5° C. to less than 50° C.: an alkyl ester, aryl ester and cycloalkyl ester of aromatic carboxylic acid having substituent(s) or not in the aromatic ring, a branched alkyl ester, aryl ester, arylalkyl ester and cycloalkyl ester of aliphatic carboxylic acid, an alkyl ester of alicylic carboxylic acid, a diester of dicarboxylic acid and a glyceride.

2. A reversible heat-sensitive recording composition as claimed in claim 1, wherein said ester of aromatic carboxylic acid is selected from the group consisting of stearyl 2-methylbenzoate, cetyl 4-tert-butylbenzoate, behenyl 4-cyclohexylbenzoate, myristyl 4-phenylbenzoate, lauryl 4-octylbenzoate, hexyl 3,5-dimethylbenzoate, stearyl 3-ethylbenzoate, butyl 4-benzylbenzoate, octyl 3-methyl-5-chlorobenzoate, decyl 4-isopropylbenzoate, stearyl 4-benzoylbenzoate, stearyl 1-naphthoate, cetyl phenylacetate, stearyl phenylacetate, phenyl 4-tert-butylbenzoate, 4-chlorobenzyl 2-methylbenzoate, stearyl 4-chlorobenzoate, myristyl 3-bromobenzoate, stearyl 2-chloro-4-bromobenzoate, decyl 3,4-dichlorobenzoate, octyl-2,4-dibromobenzoate, cetyl 3-nitrobenzoate, cyclohexyl 4-aminobenzoate, cyclohexylmethyl 4-aminobenzoate, cetyl 4-dietylaminobenzoate, stearyl 4-anilinobenzoate, decyl 4-methoxybenzoate, cetyl 4-methoxybenzoate, stearyl 4-methoxybenzoate, octyl 4-butoxybenzoate, cetyl 4-butoxybenzoate, 4-methoxybenzylbenzoate, cetyl p-chlorophenylacetate, stearyl p-chlorophenylacetate, decyl 3-benzoylpropionate, cyclohexyl 2-benzoylpropionate, myristyl benzoate, cetyl benzoate, stearyl benzoate 4-chlorobenzyl benzoate, benzyl cinnamate, and cyclohexylmethyl cinnamate; said ester of aliphatic carboxylic acid is selected from the group consisting of benzyl caproate, 4-chlorobenzyl caprate, 4-methoxybenzyl myristate, 4-methoxybenzyl stearate, benzyl palmitate, 4-nitrobenzyl stearate, neopentyl caprylate, neopentyl laurate, neopentyl stearate, neopentyl behenate, cyclohexyl laurate, cyclohexyl myristate, cyclohexyl palmitate, cyclohexylmethyl stearate, 2-cyclohexylethyl stearate, 3-phenylpropyl stearate, 4-methoxybenzyl caproate, 4-methoxybenzyl caprate, 2-chlorobenzyl myristate, 4-isopropylbenzyl stearate, phenyl 11-bromolaurate and 4-chlorophenyl 11-bromolaurate; said ester of alicyclic carboxylic acid is selected from the group consisting of stearyl cyclohexylformate, stearyl cyclohexylacetate and stearyl 2-cyclohexylpropionate; said diester of dicarboxylic acid is selected from the group consisting of didecyl adipate, dilauryl adipate, dimyristyl adipate, dicetyl adipate, distearyl adipate, dibenzyl sebacate, distearyl tere-phthalate, dineopentyl 4,4'-diphenylcarboxylate and dibenzyl azodicarboxylate; and said glyceride is selected from the group consisting of trilaurin, trimyristin, tristearin, dimyristin and distearin.

* * * * *